United States Patent
Choi et al.

(10) Patent No.: US 9,496,142 B2
(45) Date of Patent: Nov. 15, 2016

(54) DUMMY GATE PLACEMENT METHODOLOGY TO ENHANCE INTEGRATED CIRCUIT PERFORMANCE

(71) Applicant: Texas Instruments Incorporated, Dallas, TX (US)

(72) Inventors: Younsung Choi, Allen, TX (US); Shashank Ekbote, Allen, TX (US); Gregory Charles Baldwin, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 18 days.

(21) Appl. No.: 14/577,299

(22) Filed: Dec. 19, 2014

(65) Prior Publication Data

US 2015/0187585 A1    Jul. 2, 2015

Related U.S. Application Data (60) Provisional application No. 61/921,515, filed on Dec. 29, 2013.

(51) Int. Cl.
| | |
|---|---|
| H01L 21/027 | (2006.01) |
| H01L 21/28 | (2006.01) |
| H01L 27/02 | (2006.01) |
| G03F 1/00 | (2012.01) |
| G06F 17/50 | (2006.01) |

(52) U.S. Cl.
CPC .......... H01L 21/0271 (2013.01); G03F 1/144 (2013.01); H01L 21/28123 (2013.01); H01L 27/0207 (2013.01); G06F 17/5072 (2013.01); G06F 2217/72 (2013.01)

(58) Field of Classification Search
None
See application file for complete search history.

(56) References Cited

U.S. PATENT DOCUMENTS

| | | | | |
|---|---|---|---|---|
| 6,062,811 A  * | 5/2000 | Zombo | ... | F01D 5/187 340/449 |
| 7,785,946 B2 * | 8/2010 | Haffner | ... | H01L 21/28123 257/368 |
| 8,078,998 B2 * | 12/2011 | Haffner | ... | H01L 21/28123 257/368 |
| 8,809,958 B2 * | 8/2014 | Haffner | ... | H01L 21/28123 257/368 |
| 2009/0079005 A1 * | 3/2009 | Haffner | ... | H01L 21/28123 257/368 |
| 2010/0276759 A1 * | 11/2010 | Haffner | ... | H01L 21/28123 257/368 |
| 2012/0074499 A1 * | 3/2012 | Haffner | ... | H01L 21/28123 257/368 |
| 2014/0353757 A1 * | 12/2014 | Haffner | ... | H01L 21/28123 257/368 |

* cited by examiner

*Primary Examiner* — Erik Kielin
(74) *Attorney, Agent, or Firm* — Jacqueline J. Garner; Frank D. Cimino (57) ABSTRACT

A method for increasing the performance of an integrated circuit by reducing the number of dummy gate geometries next to transistors in the speed path of an integrated circuit.

17 Claims, 8 Drawing Sheets

DUMMY GATE PLACEMENT METHODOLOGY TO ENHANCE INTEGRATED CIRCUIT PERFORMANCE

CROSS-REFERENCE TO RELATED APPLICATIONS

This application claims the benefit of priority under U.S.C. §119(e) of U.S. Provisional Application 61/921,515 (Texas Instruments docket number TI-71498, filed Dec. 29, 2013), the contents of which are hereby incorporated by reference.

FIELD OF INVENTION

This invention relates to the field of integrated circuits. More particularly, this invention relates to stress enhancement of transistor performance in integrated circuits.

BACKGROUND

In an integrated circuit, it is desirable for all transistors with the same designed transistor gate (gate) length to have the same performance. It has been found that transistor performance is dependent upon the environment surrounding the gate. For example, transistors with closely spaced (dense) gates have significantly different performance than transistors with isolated gates even though both are designed with the same gate width and length. Photo lithography effects during printing and micro-loading effects during etch contribute to the performance differences.

In order to minimize differences, dummy gates are placed next to isolated active gates so the isolated active gates appear to have an environment similar to dense gates during photolithography and during plasma etch. It is common to surround an isolated gate with multiple dummy gates and to place multiple dummy gates next to the outer most gate of a series of dense gates so all the gates have a similar environment during pattern and etch.

SUMMARY

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to a more detailed description that is presented later.

An integrated circuit with improved performance is formed by reducing the number of dummy gate geometries next to transistors in the speed path of the integrated circuit. A computerized method is employed to form an integrated circuit with improved performance by reducing number of dummy gate geometries next to transistors in the speed path of an integrated circuit.

DETAILED DESCRIPTION OF EXAMPLE EMBODIMENTS

The present invention is described with reference to the attached figures. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As shown in FIG. 1A through 1C and FIG. 2, the drive current of a p-type metal-oxide-semiconductor (PMOS) transistor with an overlying compressive stress liner depends upon the number of dummy gates 104, 106, and 108 adjacent to the transistor gate 102.

Figure 1A:
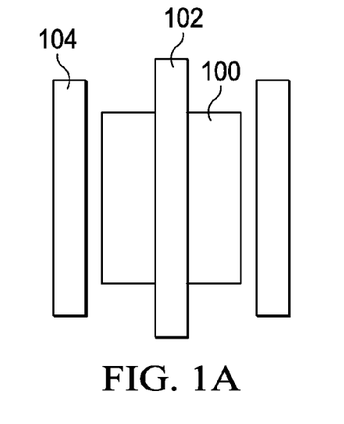
FIG. 1A-1C are transistor layouts with an active gate and one or more dummy gates.

The drive current 204 (FIG. 2) of the PMOS transistor in FIG. 1A with one dummy gate 104 on each side of the transistor gate 102 is about 520 microamps per micron. The transistor gate 102 of this transistor overlies active area 100.

Figure 1B:
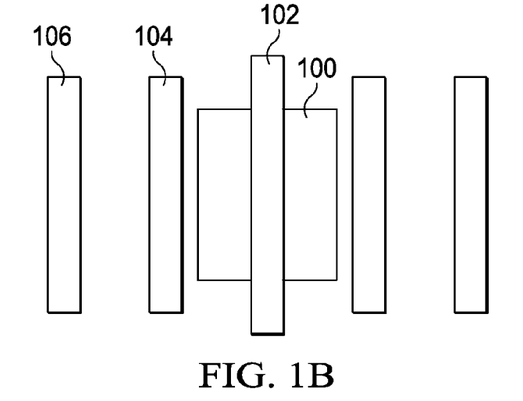

The drive current 206 of the PMOS transistor in FIG. 1B with two dummy gates, 104 and 106, on each side of the transistor gate 102 is about 480 microamps per micron. The drive current 206 of the PMOS transistor in FIG. 1B with two dummy gate leads on each side of the transistor gate 102 is about 40 microamps per micron less than the drive current 204 of the PMOS transistor with one dummy gate lead on each side of the gate 102 in FIG. 1A.

Figure 1C:
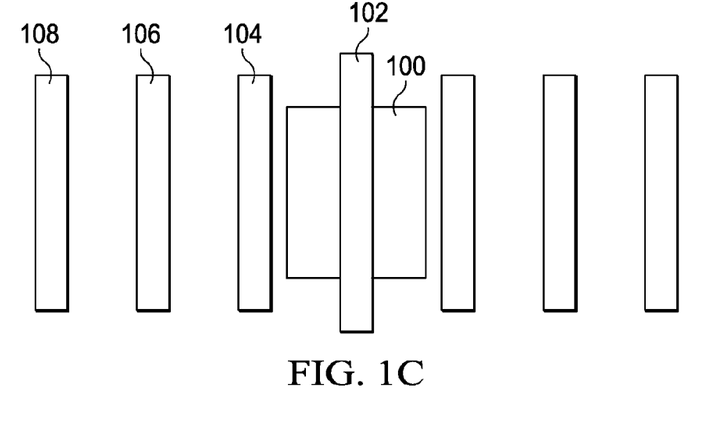
Figure 2:
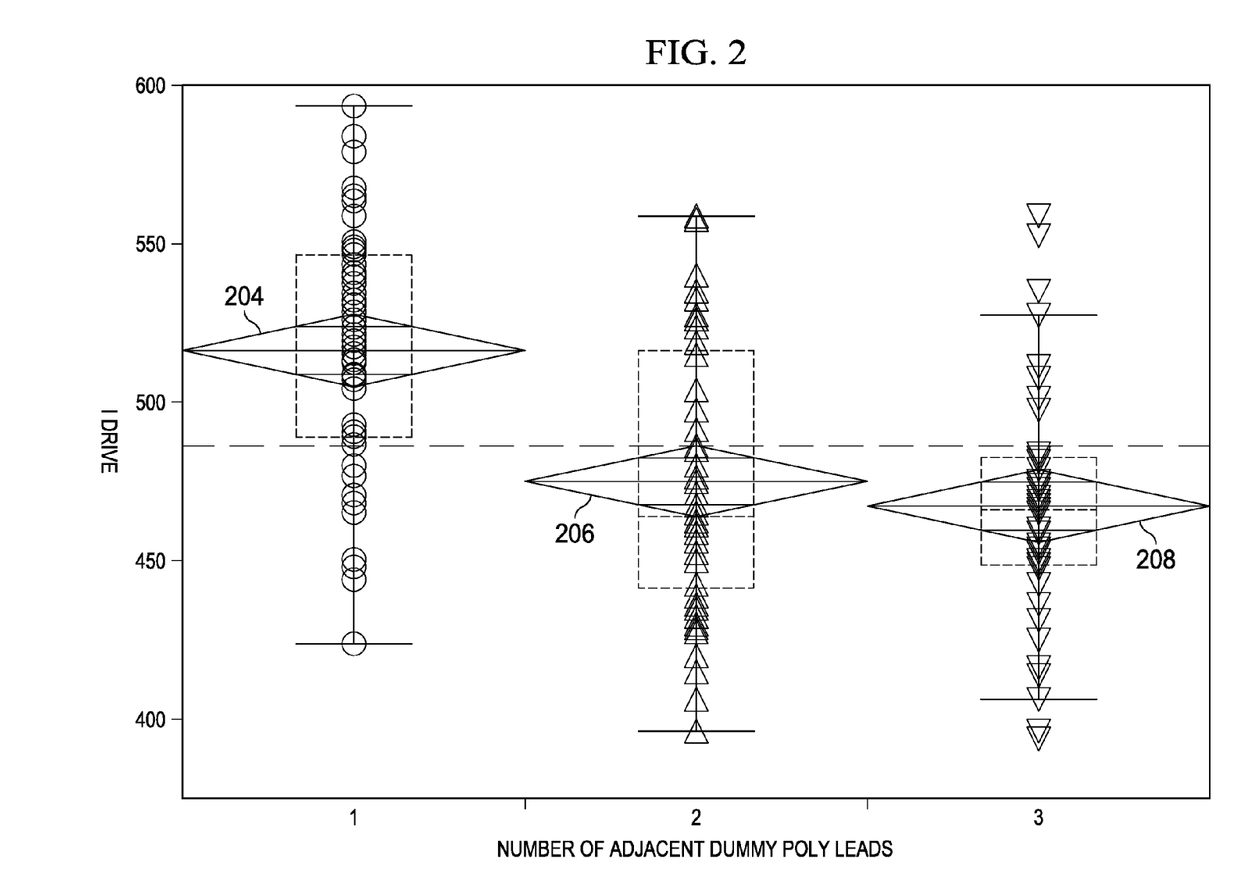
FIG. 2 is a graph of the drive current of transistors with the layouts in FIG. 1.

The drive current 208 of the PMOS transistor in FIG. 1C with three dummy gate leads, 104, 106, and 108 on each side of the gate 102 is about 470 microamps per micron. The drive current 208 of the PMOS transistor in FIG. 1C with three dummy gate leads, 104, 106, 108 on each side of the gate 102 of the PMOS transistor is about 50 microamps per micron less than the drive current 204 of the PMOS transistor with one dummy poly lead on each side of the transistor gate 102 of the PMOS transistor in FIG. 1A.

The ability of an overlying compressive stress liner to apply stress to the channel of the PMOS transistor is reduced when the compressive stress liner is deposited over topography adjacent to the transistor gate 102 such as the dummy gates 104, 106, and 108. The drive current of PMOS transistors and therefore the performance of the integrated circuit is reduced as the number of dummy gate leads adjacent to the transistor gate increases.

Figure 3A:
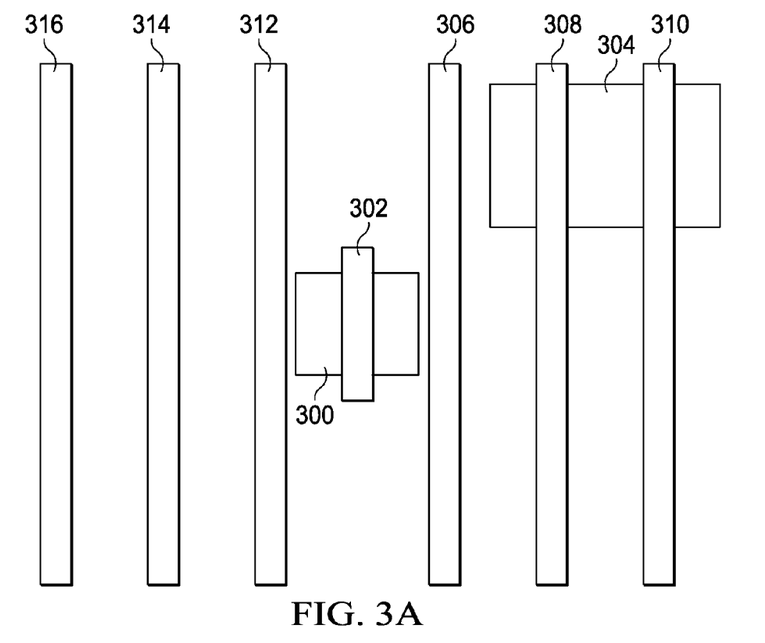
FIG. 3A-3C are plan views of embodiments of the principles of the invention

FIG. 3A shows an example layout of transistors in an integrated circuit. A first transistor with one transistor gate 302 is formed over active region 300. Second and third transistors are formed with transistor gates 308 and 310 over common active region 304. Transistor gates 308 and 310 are extended to provide a uniform environment for the first transistor gate 302. As shown previously, dummy poly leads adjacent to the transistor gate 302 reduce the performance of the transistor. Transistor gate 302 may be a transistor in the speed path of an integrated circuit where transistor performance is critical.

Figure 3B:
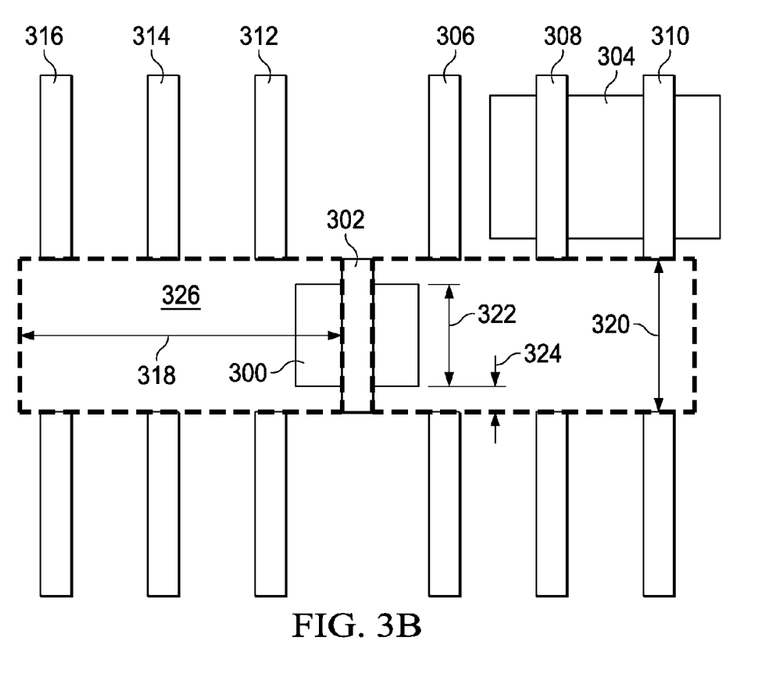

In a first embodiment, where performance of transistor 302 is critical, design rules may be formulated to define a dummy gate keep-out zone 326 adjacent to the transistor gate 302 as is illustrated in FIG. 3B. A keep-out zone length 318 may be defined perpendicular to transistor gate 302. A keep-out zone width 320 may be defined as the transistor width 322 plus two times a keep-out zone minimum space 324 to active design rule. The keep-out zone minimum width is typically 30 nm greater than the transistor width.

In a first embodiment illustrated in FIG. 3B, dummy gate geometries that lie within the keep-out regions are removed. This provides for maximum stress to be applied to the gate and therefore for maximum transistor performance improvement.

Figure 3C:
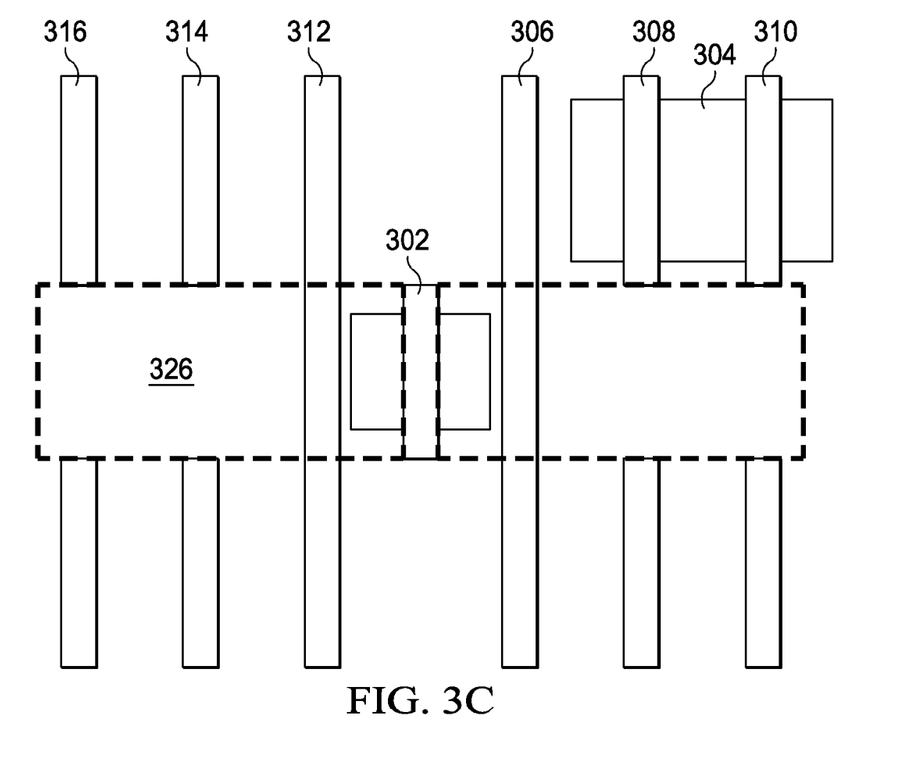

Because transistor gate 302 profile and therefore transistor-to-transistor variation is most strongly dependent upon the presence of the adjacent dummy gate 306, as shown in a second embodiment in FIG. 3C, the adjacent dummy gate, 306 and 312, geometries within the dummy gate keep-out zone 326 may be retained whereas additional dummy gate, 308, 310, 314, and 316, geometries may be removed. Retaining the adjacent dummy gates may provide the best compromise between transistor performance and transistor-to-transistor variation.

Figure 4A:
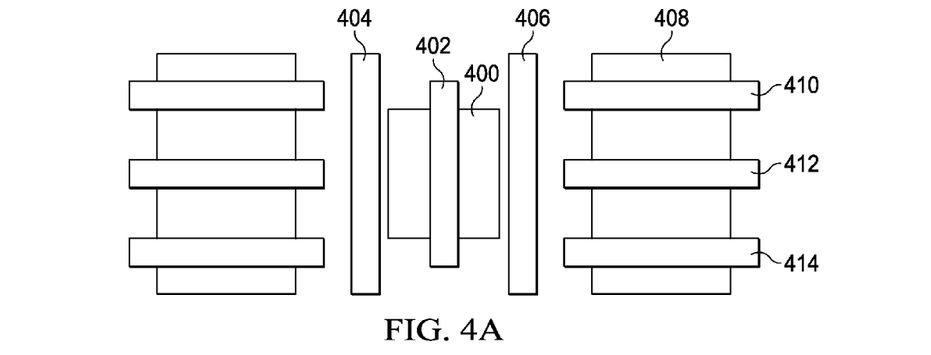
FIG. 4A-4C are plan views of embodiments of the principles of the invention
Figure 4B:
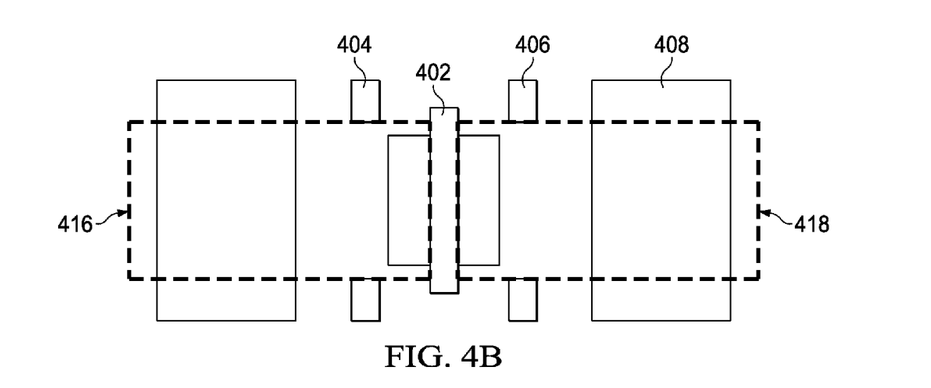
Figure 4C:
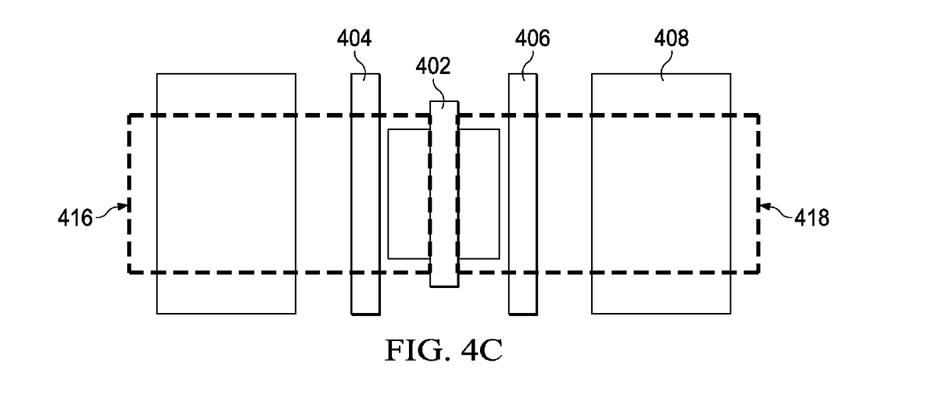

Other example embodiments are illustrated in FIGS. 4A-4C. In this example embodiment, there is an adjacent dummy gate 404 and 406 on each side of the transistor gate 402. In addition, there are three horizontal dummy gates 410, 412, and 414, over dummy active 408 adjacent to the transistor active 400. Transistor gate 402 may be in the speed path of the integrated circuit so transistor performance is critical.

As shown in FIG. 4B, dummy gate keep-out zones 416 and 418 may be applied on both sides of the transistor gate 402 and all dummy gate geometries that fall within the keep-out zones 416 and 418 may be removed. This provides for maximum stress to be applied to the transistor gate and therefore for maximum transistor performance improvement.

Because the active transistor gate 402 profile and therefore transistor-to-transistor variation is most strongly dependent upon the presence of the adjacent dummy gates, 404 and 406, as shown in FIG. 4C, the adjacent dummy gate, 404 and 406, geometries within the dummy gate keep-out zone 416 may be retained and additional dummy gate, 410, 412, and 416, geometries may be removed. This may provide the best compromise between transistor performance and transistor-to-transistor variability.

Figure 5A:
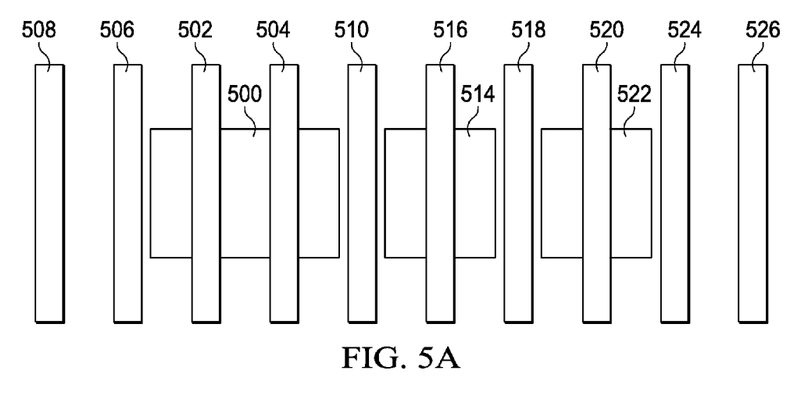
FIG. 5A-5C are plan views of embodiments of the principles of the invention
Figure 5B:
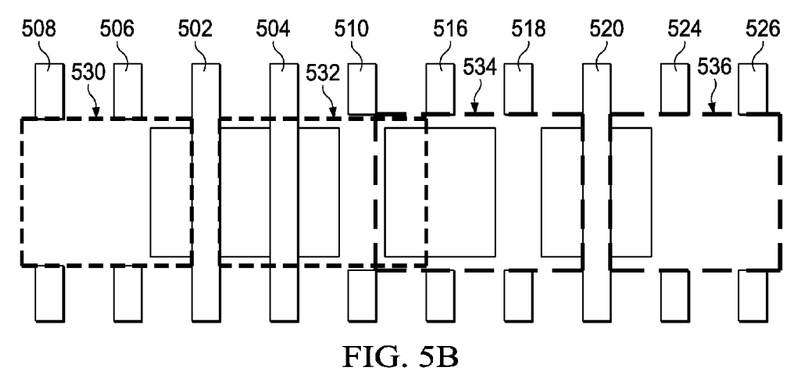
Figure 5C:
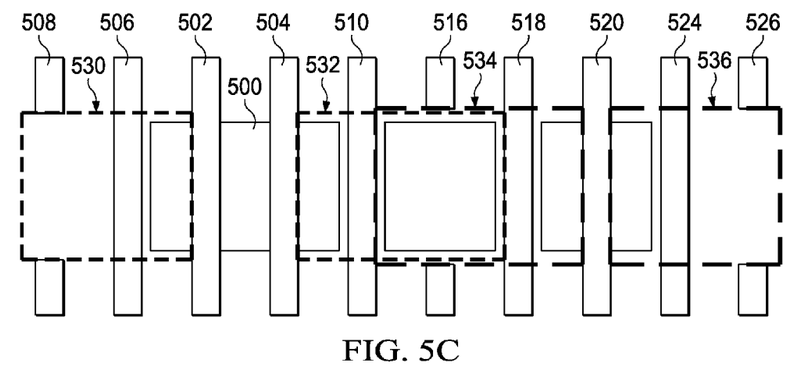

Additional embodiments are illustrated in FIG. 5A-5C. This example integrated circuit shows two critical transistor gates 502 and 504 in series (dual critical transistor) over a common active area 500 and a single critical transistor gate 520 over transistor active area 522 (single critical transistor). A dummy transistor with a single dummy gate 516 over dummy active region 510 lies between critical transistor active regions 500 and 522. One dummy gate 518 lies between the single critical transistor gate 520 and the dummy transistor gate 516 and another dummy gate 510 lies between the dummy transistor gate 520 and the dual critical transistor gate 504.

Two dummy gates, an adjacent dummy gate 506 and a second dummy gate 508 lie next to the dual critical transistor gate 502 and two dummy gates, and adjacent dummy gate 524 and a second dummy gate 526 lie next to the single critical gate 520. The transistor gates and the dummy gates are stacked in series (508, 506, 502, 504, 510, 516, 518, 524, 526) at constant pitch A first embodiment is illustrated in FIG. 5B. When critical transistor gates are in series, dummy gate geometry keep-out zones 530 and 532 may be applied adjacent to the outermost critical series transistor gates. A first dummy gate geometry keep-out zone 530 is formed adjacent to the out facing side of critical series transistor gate 502 and a second dummy gate geometry keep-out zone 532 is formed adjacent to the out facing side of critical series transistor gate 504.

A third dummy gate geometry keep-out zone 534 is formed adjacent to a first side of critical single transistor gate 520 and a fourth dummy gate geometry keep-out zone 536 is formed adjacent to a second side of critical single transistor gate 520.

As shown in FIG. 5B dummy gate geometries (508, 506, 510, 514, 518, 524, and 526) that fall within the dummy gate geometry keep-out zones 530, 532, 534, and 536 may be removed. This includes the gate 514 of the dummy transistor. Removal of all dummy gate geometries within the dummy gate geometry keep-out zones provides for maximum increase in the stress from a stress liner and therefore maximum increase in transistor performance.

Because the critical transistor gate 502, 504, and 520 profiles and therefore transistor-to-transistor variation is most strongly dependent upon the presence of the adjacent dummy gates, 506, 510, 518, and 520, as shown in FIG. 5C, the adjacent dummy gate, 506, 510, 518, and 520, geometries within the dummy gate keep-out zones 530, 532, 534, and 536 may be retained whereas the remaining non adjacent dummy gate, 508, 516, and 526, geometries may be removed. This embodiment may provide for the best compromise between transistor-to-transistor variation and performance improvement for transistors in the integrated circuit critical speed path.

Although the above embodiments are illustrated using PMOS transistors, NMOS transistors also benefit from the illustrated embodiments. By removing dummy gate geometries adjacent to NMOS transistors in the critical path, the tensile stress applied to the channel of the NMOS transistor may be increased thereby increasing the performance of NMOS transistors in the speed path of the integrated circuit. The embodiments may be applied to only PMOS transistors, only to NMOS transistors, or may be applied to both PMOS and NMOS transistors in the speed path of an integrated circuit using dual stress liner technology. The embodiments may also be applied to either NMOS transistors or PMOS transistors with single liner stress technology. In this case the stress of the film over the transistor that is degraded by the stress may be reduced by implanting the film over the transistor that is degraded to reduce film stress.

The embodiments may be implemented in several ways. Circuit designers may layout the integrated circuit and flag transistors in the speed path. Designers may draw dummy gates during layout or designers may run a software program which automatically places dummy gates after layout.

When dummy gate placement software is used to add the adjacent dummy gates, additional code may be implemented in the dummy gate placement software to place dummy gate keep-out zones adjacent to transistors in the speed path of the integrated circuit that have been flagged by the designers.

The code may be written to remove all dummy gate geometries within the keep-out zones as illustrated in FIGS. 3B, 4B, and 5B. Alternatively, code may be written to retain one adjacent dummy gate geometry on each side of the critical transistor gate and to remove dummy gate geometries beyond the one adjacent dummy gate geometries as illustrated in FIGS. 3C, 4C, and 5C.

The software may remove the dummy gate geometries completely or to improve printing resolution of the transistor gates, the software may replace the dummy gate geometries within the dummy gate geometry keep-out zone with subresolution dummy gate geometries. Subresolution dummy gate geometries are sufficiently large to scatter light thus improving resolution but sufficiently small that they do not print.

Figure 6:
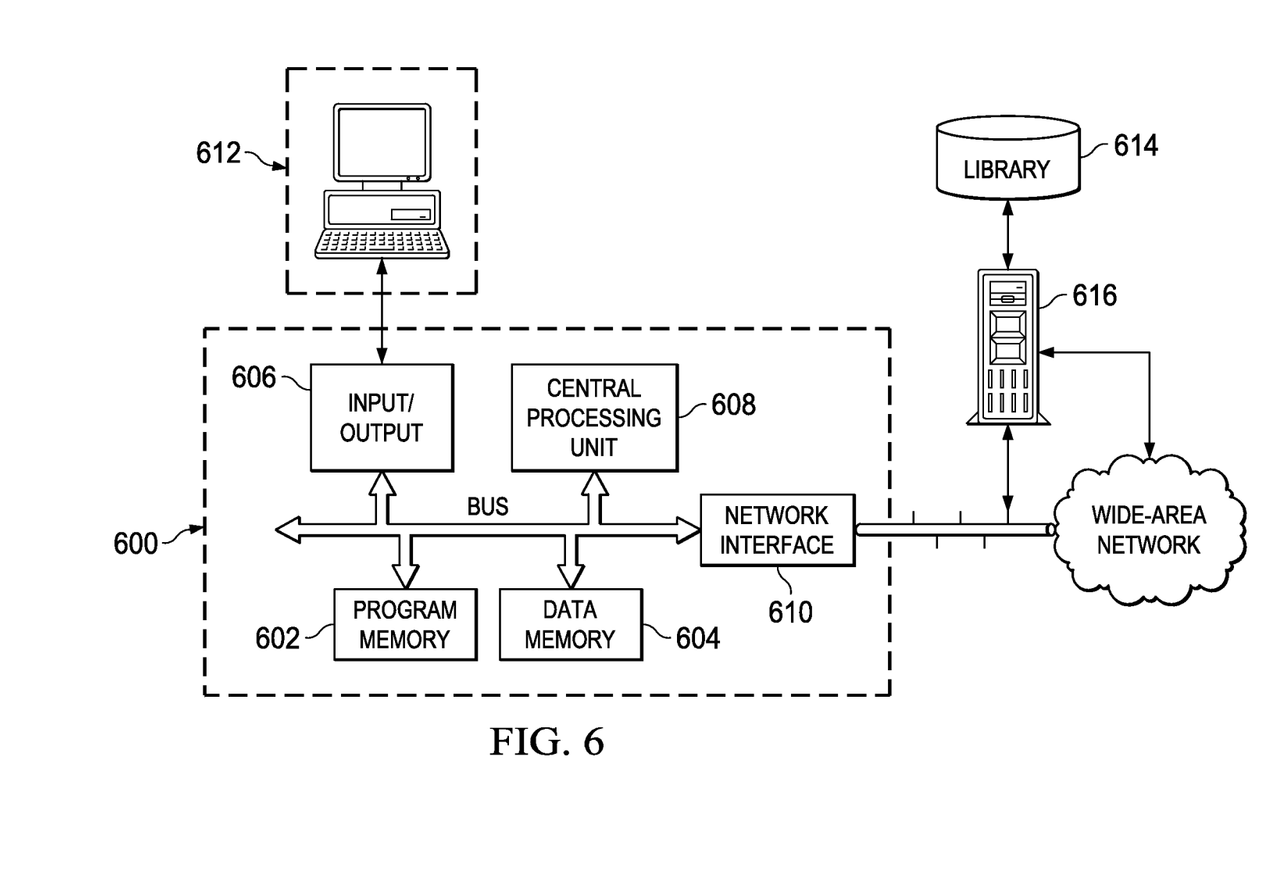
FIG. 6 is an electrical diagram, in schematic form, illustrating a computer system for generating integrated circuit transistor gate patterns according to principles of this invention.

FIG. 6 illustrates the construction of a system used to perform the addition of dummy gate geometries to an integrated circuit transistor gate pattern and to perform the selective removal of dummy gate geometries or the replacement of selected dummy gate geometries with subresolution dummy gate geometries according to embodiments of the invention. In this example, the gate transistor pattern generation system is realized by way of a computer system including workstation 600 connected to server 616 by way of a network through network interface 610. Of course, the particular architecture and construction of a computer system useful in connection with this invention can vary widely. For example, the transistor dummy gate may be realized by a single physical computer, such as a conventional workstation or personal computer, or alternatively may be a computer system implemented in a distributed manner over multiple physical computers. Accordingly, the generalized architecture illustrated in FIG. 6 is provided by way of example only.

As shown in FIG. 6, workstation 600 includes central processing unit (CPU) 608, coupled to the system bus BUS. Also coupled to system bus BUS is input/output interface 606 which refers to those interface resources by way of which peripheral functions 612 (e.g., keyboard, mouse, display, etc.) communicate with the other constituents of workstation 600. CPU 608 refers to the data processing capability of workstation 600, and as such may be implemented by one or more CPU cores or co-processing circuitry. The particular construction and capability of central processing unit 608 is selected according to the application needs of workstation 600. In the architecture of layout modification system according to this example, program memory 602 and data memory 604 are coupled to the system bus BUS. The workstation 600 and server 616 may also be coupled to a library 614 which may store programs, data, and integrated circuit net lists and layout patterns such as integrated circuit patterns.

Figure 7:
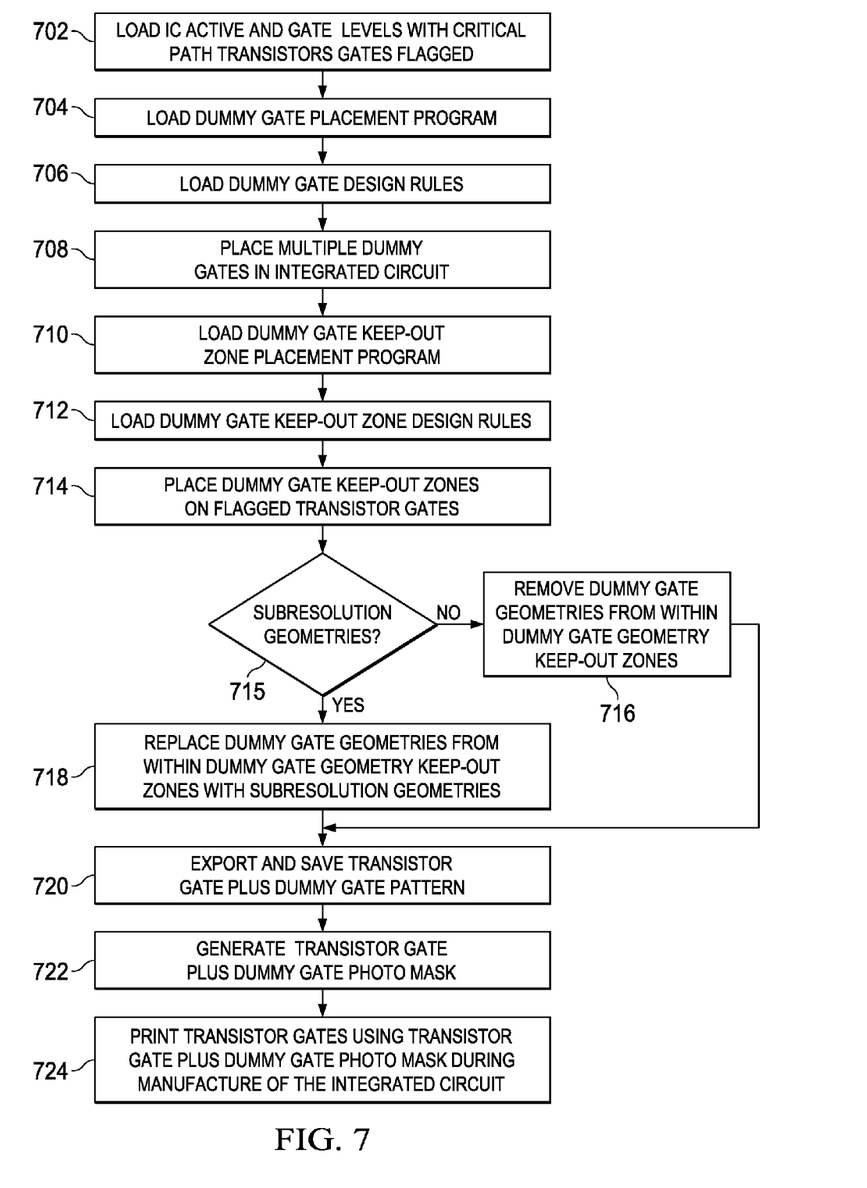
FIG. 7 is a flow diagram illustrating the method for generating integrated circuit transistor gate patterns according to principles of this invention.

FIG. 7 is a process flow diagram illustrating an automated method for placing multiple dummy gates adjacent to integrated circuit active gates and to selectively either remove or replace dummy gate geometries proximate to transistors in the speed path of the integrated circuit. In step 702 the gate and active patterns are loaded from a storage area such as the server 616 or library storage 614 into the workstation 600. Transistor gates in the speed path of the integrated circuit may be flagged by designers so that the software may identify critical gates.

In step 704 the dummy gate placement program is loaded into the workstation 600.

Referring now to step 706, dummy gate design rules are loaded into the workstation 600.

In step 708 the dummy gate placement program places dummy gates (which may be multiple dummy gates) next to the transistor gates in the integrated circuit. The dummy gates immediately adjacent to the transistor gate are typically parallel to the transistor gate. Dummy gates next to the adjacent dummy gates may be either parallel as shown in FIGS. 3A and 5A or may be perpendicular shown in FIG. 4A.

After placement of the dummy gates according to the dummy gate design rules, the dummy gate keep-out zone placement program is loaded into the workstation 600. This is shown as a separate step for clarity. The dummy gate placement program and dummy gate keep-out zone program may be combined into one program.

In step 712 the dummy gate keep-out zone design rules are loaded into the workstation 600. This is shown as a separate step for clarity, but the dummy gate design rules and dummy gate keep-out zone design rules may be simultaneously loaded.

Dummy gate keep-out zones are placed next to flagged critical transistor gates in step 714. For individual critical transistor gates one dummy gate keep-out zone is placed on each side of the individual critical transistor gate. When there are more than one flagged critical transistor gate in series, one dummy gate keep-out zone is placed next to each of the outermost of the series critical transistor gates as shown in FIGS. 5B and 5C.

In step 715, a choice may be made to either remove dummy gate geometries from the dummy gate geometry keep-out zones or to replace them with subresolution dummy gate geometries.

If the decision is to remove the dummy gate geometries, the program proceeds to step 716 and the dummy gate geometries are removed.

If, however, the decision is to replace the dummy gate geometries within the dummy gate keep-out zone with subresolution dummy gate geometries, the program proceeds to step 718 where the dummy gate geometries are replaced with subresolution dummy gate geometries.

A decision may also be made to not remove the adjacent dummy gates as illustrated in FIGS. 3C, 4C, and 5C. These choices may be defined in the dummy gate keep out zone design rules.

In step 720 the transistor gate pattern with dummy gate geometries selectively removed from transistors in the speed path is exported to the server 616 or to a storage media such as a library 614.

This transistor gate pattern may then be used to generate an integrated circuit transistor gate photo mask in step 722.

In step 724, the gate photo mask may be used to print the gate photo pattern in resist on a wafer during the manufacture of an integrated circuit.

Those skilled in the art to which this invention relates will appreciate that many other embodiments and variations are possible within the scope of the claimed invention.

What is claimed is:

1. A process of forming an integrated circuit, comprising the steps:
   providing a transistor gate pattern with transistor gates wherein at least one transistor is in a speed path of the integrated circuit and is a critical transistor;
   providing a set of dummy gate placement design rules;

providing a set of dummy gate keep-out zone design rules;
operating a computer system further comprising the steps of:
loading a dummy gate placement program into the computer system;
loading a dummy gate design rule set into the computer system;
running the dummy gate placement program to place dummy gates adjacent to the transistor gates and adjacent to the critical transistor gate to form a transistor gate plus dummy gate pattern and wherein the dummy gate placement program utilizes the dummy gate design rule set;
loading a dummy gate keep-out zone placement program into the computer system;
loading a dummy gate keep-out zone design rule set into the computer system;
running the dummy gate keep-out zone placement program to place a dummy gate keep-out zone adjacent to each side of the gate of the critical transistor;
removing at least one dummy gate geometry from the dummy gate keep-out zone to form an updated transistor date plus dummy gate pattern; and
exporting and saving the updated transistor active gate plus dummy gate pattern in an electronic data storage medium.

2. The process of claim 1 further comprising the steps:
removing all dummy gates from the dummy gate keep-out zones.

3. The process of claim 1 further comprising the steps:
removing all dummy gate geometries within the dummy gate keep-out zone except for one adjacent dummy gate geometry.

4. The process of claim 1 further comprising the steps:
replacing all dummy gate geometries within the dummy gate keep-out zone with subresolution dummy gate geometries.

5. The process of claim 1 further comprising the steps:
replacing all dummy gate geometries within the dummy gate keep-out zone with subresolution dummy gate geometries except the adjacent dummy gate geometry is not replaced with a subresolution dummy gate geometry.

6. The process of claim 1 further comprising the steps:
making a transistor gate plus dummy gate photo mask using the transistor gate plus dummy gate pattern; and
printing the transistor gate plus dummy gate pattern in resist on a wafer during manufacture of the integrated circuit.

7. A process of forming an integrated circuit, comprising the steps:
forming a transistor gate pattern layout with a transistor gate geometry associated with a critical gate in a speed path of the integrated circuit;
adding at least two dummy gate geometries adjacent to a first side of the transistor gate geometry to the transistor gate pattern layout;
adding at least two dummy gate geometries adjacent to a second side of the transistor gate geometry to the transistor gate pattern layout;
defining a first dummy gate keep-out zone on the first side of the transistor gate geometry;
defining a second dummy gate keep-out zone on the second side of the transistor gate geometry; and
removing at least one dummy gate geometry from the transistor gate pattern layout in each of the first and the second dummy gate keep-out zones;
after removing the at least one dummy gate geometry, saving the transistor gate pattern layout in a data base;
then, having a gate pattern photo mask generated using the saved transistor gate pattern layout with the at least one dummy gate geometry removed; and
printing the saved transistor gate pattern layout using the gate pattern photo mask in photo resist on a wafer during manufacture of the integrated circuit.

8. The process of claim 7, further comprising the step of removing dummy gates within the first and second dummy gate keep-out zones except one adjacent dummy gate on each side of the critical transistor is not removed.

9. The process of claim 7, further comprising the step of removing all dummy gates within the first and second dummy gate keep-out zones.

10. The process of claim 7, further comprising the step of replacing all dummy gates within the first and second dummy gate keep-out zones with subresolution dummy gate geometries except one adjacent dummy gate on each side of the critical transistor is not replaced with a subresolution dummy gate.

11. The process of claim 7, further comprising the step of replacing all dummy gates within the first and second dummy gate keep-out zones with subresolution dummy gate geometries.

12. A process of forming an integrated circuit, comprising the steps:
printing a transistor gate pattern in photo resist on a wafer during manufacture of the integrated circuit using a gate pattern photo mask, wherein the transistor gate pattern on the gate pattern photo mask includes:
a transistor gate geometry;
dummy gate geometries;
a first dummy gate keep-out zone on a first side of the transistor gate geometry;
a second dummy gate keep-out zone on a second side of the transistor gate geometry, wherein each of the first and second dummy gate keep-out zones include a space in place of a dummy gate geometry.

13. The process of claim 12, wherein the first and second dummy gate keep-out zones each include one adjacent dummy gate geometry on each side of the transistor gate geometry.

14. The process of claim 12, wherein the first and second dummy gate keep-out zones include none of the dummy gate geometries.

15. The process of claim 13, wherein the space in place of the dummy gate geometry in the first and second dummy gate keep-out zones includes subresolution geometries.

16. The process of claim 14, wherein the space in place of the dummy gate geometry in the first and second dummy gate keep-out zones includes subresolution geometries.

17. The process of claim 12, wherein the first and second dummy gate keep-out zones each include one adjacent dummy gate geometry on each side of the transistor gate geometry and multiple ones of the space in place of a dummy gate geometry.

* * * * *